(12) United States Patent
DiValentin et al.

(10) Patent No.: US 7,374,668 B1
(45) Date of Patent: May 20, 2008

(54) VALVE AUTOMATED IN-SITU CLEANING SYSTEM FOR OIL WATER SEPARATOR

(75) Inventors: Mario DiValentin, Alexandria, VA (US); Stephan J. Verosto, Knoxville, MD (US); Richard R. Leung, Herndon, VA (US); Mitchell E. Price, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 438 days.

(21) Appl. No.: 10/985,071

(22) Filed: Nov. 5, 2004

(51) Int. Cl.
*B01D 17/12* (2006.01)
(52) U.S. Cl. .................. 210/106; 210/143; 210/410
(58) Field of Classification Search ............... 210/115, 210/410, 221.2, 106, 108, 143
See application file for complete search history.

(56) References Cited

U.S. PATENT DOCUMENTS

| | | |
|---|---|---|
| 2,366,184 A | 1/1945 | Dean |
| 2,573,615 A | 10/1951 | Seailles |
| 3,155,459 A | 11/1964 | Brown et al. |
| 3,479,281 A | 11/1969 | Kikindal |
| 3,788,981 A | 1/1974 | Richard et al. |
| 3,903,000 A | 9/1975 | Miura et al. |
| 3,975,276 A | 8/1976 | Schmid |
| 4,045,344 A | 8/1977 | Yokota |
| 4,151,075 A | 4/1979 | Othmer |
| 4,156,644 A | 5/1979 | Richard |
| 4,627,922 A * | 12/1986 | Viator et al. ................. 210/704 |
| 4,897,206 A | 1/1990 | Castelli |
| 4,933,524 A | 6/1990 | Meurer |
| 5,089,136 A | 2/1992 | Cyr |
| 5,228,983 A | 7/1993 | Nims |
| 5,326,474 A | 7/1994 | Adams et al. |
| 5,536,409 A | 7/1996 | Dunkers |
| 5,584,995 A * | 12/1996 | Meekel et al. ........... 210/221.2 |
| 5,605,636 A | 2/1997 | Wyness |
| 5,932,091 A * | 8/1999 | Tompkins et al. ............ 210/97 |
| 5,944,987 A * | 8/1999 | Czarno ....................... 210/180 |
| 5,958,240 A * | 9/1999 | Hoel ......................... 210/608 |
| 6,149,827 A | 11/2000 | Nielson |

(Continued)

FOREIGN PATENT DOCUMENTS

JP 63-001408 A 1/1988

*Primary Examiner*—Terry K Cecil
(74) *Attorney, Agent, or Firm*—Jacob Shuster; Howard Kaiser

(57) ABSTRACT

An oil/water separator tank having intake, discharge and vent fittings is conditioned for in-situ cleaning of the oil separator plate stacks positioned therein by selective opening of manual valves connected to each of such fittings. When so conditioned by opening of the manual valves, the in-situ cleaning is performed during repeated operational phases under automated control of solenoid operated and motor driven valves through which a plurality of sequential operational steps are performed, consisting of (a) low pressure air injected into an air sparging array within the separator tank, (b) supply of potable water into a mixing tank; (c) mixing of the potable water with the cleaning agent within the mixing tank; (d) introduction of the cleaning agent after the mixing thereof into the separator tank to enhance in-situ cleaning by dispersing the low pressure air from the air sparging array; and (e) drainage of collected waste oil from the separator tank into a waste oil tank.

20 Claims, 2 Drawing Sheets

U.S. PATENT DOCUMENTS 6,605,224 B2  8/2003  Aymong
6,659,290 B1  12/2003  Lawson et al.
7,163,107 B1  1/2007  Verosto et al.
2005/0121375 A1*  6/2005  Petersen ................ 210/104

* cited by examiner

VALVE AUTOMATED IN-SITU CLEANING SYSTEM FOR OIL WATER SEPARATOR

The present invention relates to in-situ cleaning of an oil/water separator under manually initiated automatic control.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Oil/water separation treatment of oily wastewater within a separator tank by its exposure to plate stacks is already well known, as well as in-situ cleaning of such plate stacks involving emergence of pressurized air from an air sparging array below the plate stacks for dispersion of a bio-emulsifier cleaning agent introduced into the separator tank as disclosed in U.S. Pat. No. 6,659,290 B1 to Lawson et al. The cleaning process heretofore involved use of personnel under high workload conditions because of required repetition of the process. Also personnel were exposed to hazardous material during mixing of the cleaning agent with water before introduction into the separator tank. It is therefore an important object of the present invention to provide for in-situ cleaning of such oil/water separator tanks with reduced personnel workload and less exposure to hazardous material.

SUMMARY OF THE INVENTION

Pursuant to the present invention, in-situ cleaning of the plate stacks within an oil/water separator tank is performed during sequentially repeated operational cleaning phases under automated control of solenoid operated valves through which the oily wastewater is circulated through the separator tank and the cleaning agent is mixed when introduced into the tank while it is in a cleaning mode selectively established under control of manual operated valves. Such cleaning mode involves inflow of the oily wastewater through an intake fitting, venting of the tank and outflow of collected waste oil from the tank through a drainage fitting into a waste oil storage tank.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
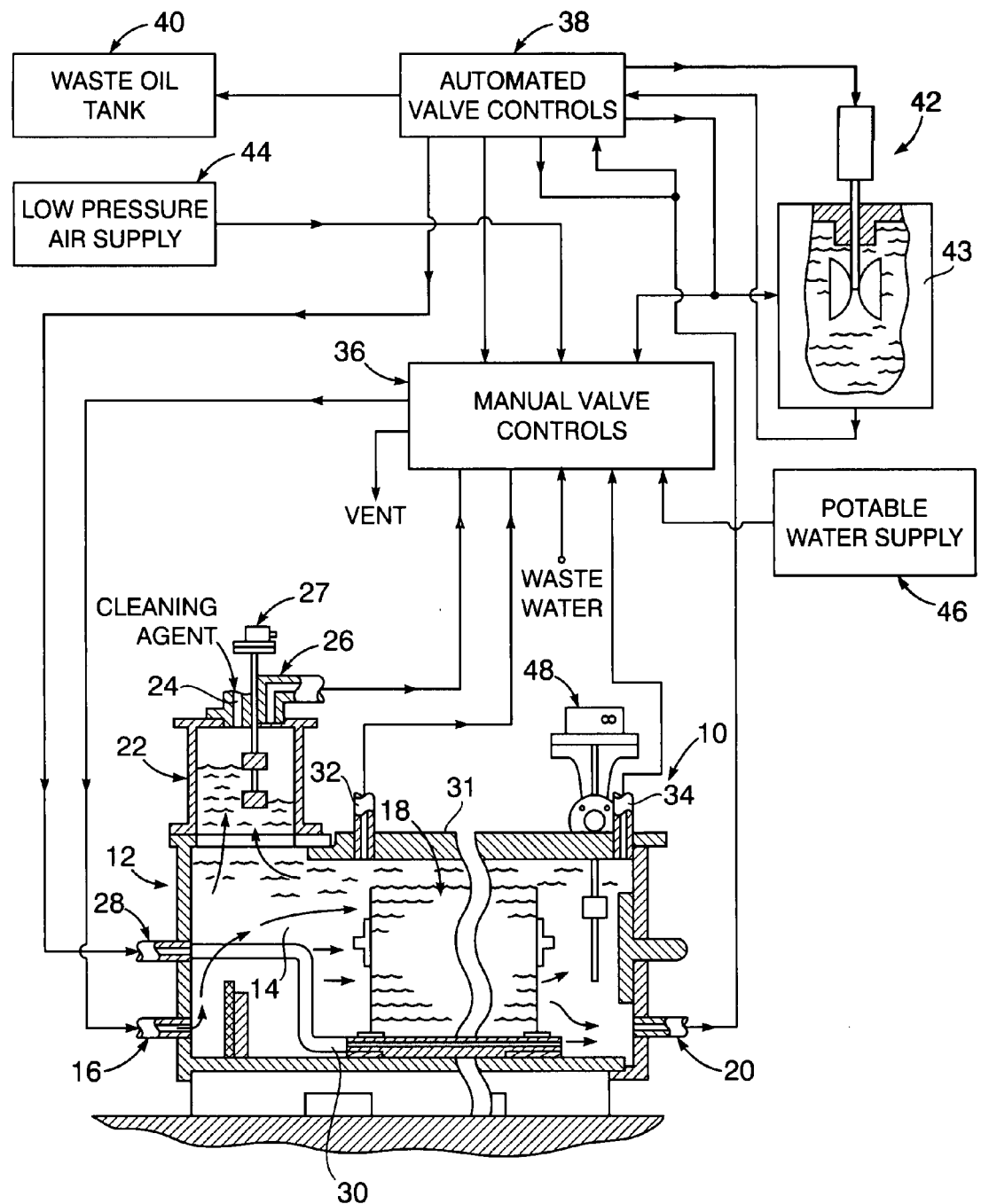
FIG. 1 is a side section view of an oil/water separation tank with attached in-situ cleaning process facilities pursuant to one embodiment of the present invention diagrammatically illustrated.

Referring now to the drawing in detail, FIG. 1 illustrates an oil/water separator 10, as disclosed in the aforementioned Lawson et al patent, with which the present invention is associated. The separator 10 has a tank 12 into which oily wastewater 14 enters through an intake fitting 16 at one end of the tank 12 adjacent the bottom thereof. The inflowing wastewater undergoes separation treatment by contact passage between plates of a stack 18, resulting in outflow of separated waste from the bottom of the tank 12 through a discharge fitting 20 extending from the end of the tank 12 opposite the end into which the intake fitting 16 extends. During such separation treatment within the tank 12, separated oil rises into an oil tower 22 mounted on top of the tank 12. A cleaning agent is injected into the oil tower 22 through an insert 24 on top thereof for periodic in-situ chemical cleaning of the plate stack 18 by removal of oil sludge deposited thereon as a result of the contact separation treatment performed. Also mounted on top of the oil tower 22 is a vent fitting 26 and a sensor 27. In-situ cleaning of the plate stack 18 also involves entry of pressurized air through an inlet fitting 28 into the conduit 30 of an air sparging array at the bottom of the tank 12 underlying the plate stack 18. Air bubbles emerging from the air sparging array disperses the cleaning agent to enhance its in-situ cleaning action.

Also mounted on a top 31 of the tank 12 as shown in FIG. 1 are vent fittings 32 and 34, located between the oil tower 22 and the end of the tank 12 from which the discharge fitting 20 extends. Venting of air from the oil tower 22 and from the chamber enclosed within the tank 12 through the vent fittings 26, 32 and 34 is under selective control of manual valve controls 36 as diagrammed in FIG. 1. Inflow of the wastewater into the tank 12 through the fitting 16 is also under manual control of the valve controls 36.

With continued reference to FIG. 1, inflow of pressurized air through the inlet fitting 28 and outflow of waste from the discharge fitting 20 is under control of automated valve controls 38 to which a waste oil tank 40 and an air driven mixer 42 are operationally connected as hereinafter explained. Also the mixer 42 is operationally connected to the manual valve controls 36, to which a low pressure air supply 44 and a potable water supply 46 are operational connected through the manual valve controls 36 as diagrammed in FIG. 1. A pressure sensor 48 is also mounted on the top 31 of the separator tank 12.

Figure 2:
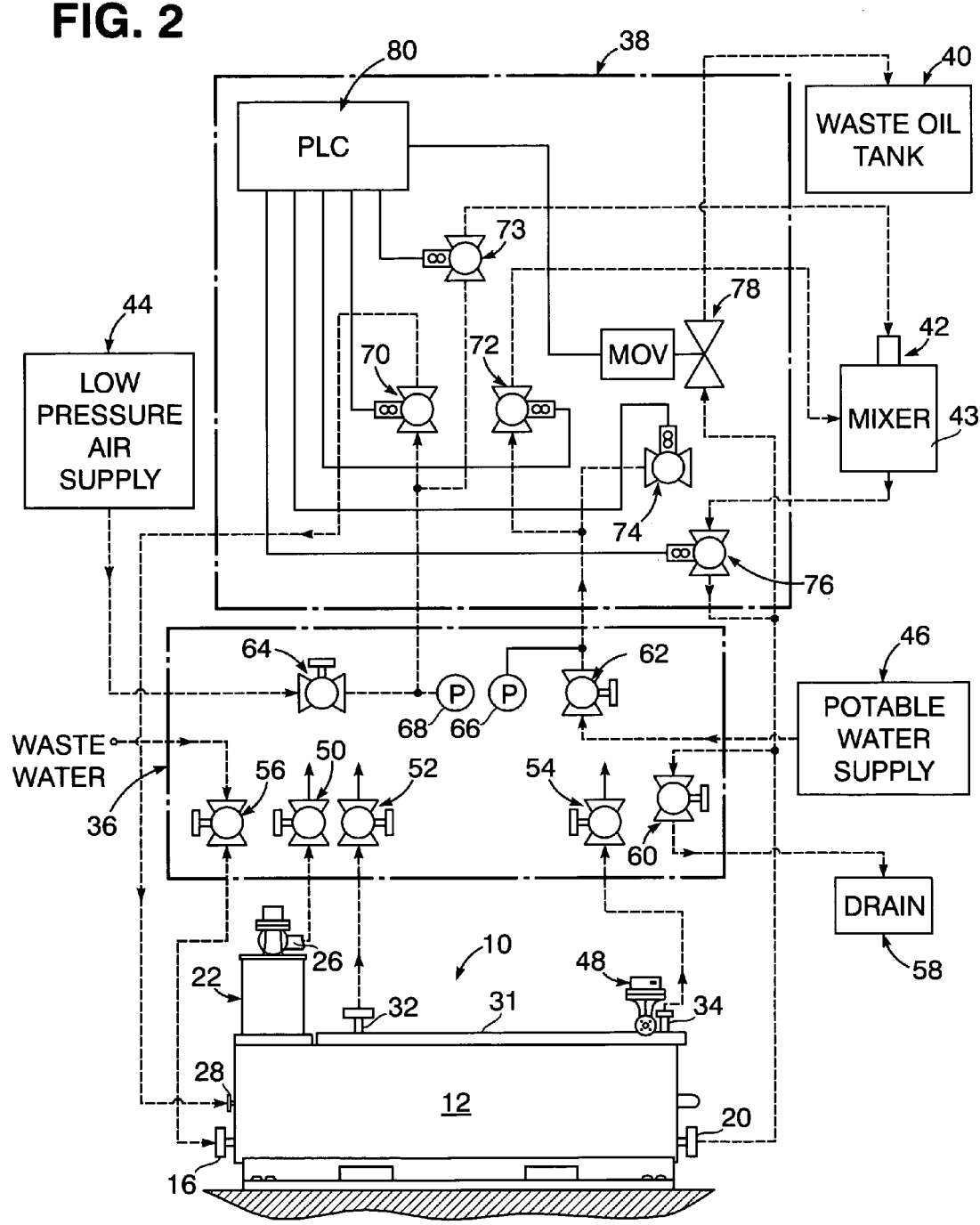
FIG. 2 is a more detailed diagrammatic illustration of the in-situ cleaning process facilities attached to oil/separator tank as shown in FIG. 1.

FIG. 2 diagrams the operational relationships between all of the foregoing referred to components of the separator 10 shown in FIG. 1, consisting of the separator fittings 16, 20, 26, 28, 32 and 34, the manual valve controls 36, the automated valve controls 38, the waste oil tank 40, the mixer 42 (which includes a mixing tank 43), the low pressure air supply 44 and the potable water supply 46. The operational interrelationship between such components as hereinafter explained accounts for an improved in-situ cleaning process with respect to the oil/water separator 10.

As shown in FIG. 2, the vent fittings 26, 32 and 34 on the top 31 of the separator 10 are respectively connected to manually operated valves 50, 52 and 54 associated with the manual valve controls 36, to selectively vent the tank 12 of the separator 10 at the oil tower 22 and at the opposite ends of the tank 12. A manually operated valve 56 controls inflow of the wastewater into the tank 12 through the intake fitting 16. Outflow of cleansed wastewater from the discharge fitting 20 to a drain 58 is under manual control of a valve 60. A valve 62 is connected to the potable water supply 46 for selective supply of water therefrom to the tank 43 of the mixer 42 through the automated valve controls 38 as hereinafter explained. A manually controlled isolation valve 64 also associated with the manual valve controls 36 connects the low pressure air supply 44 to the automated valve controls 38. Pressure sensors 66 and 68 are respectively connected to the outlets of the manual valves 62 and 64 to monitor outflow therefrom as hereinafter referred to.

With continued reference to FIG. 2, outflow of low pressure air from the supply 44 through the manual valve 64 establishes air static from which the low pressure air is conducted to a pair of air solenoid valves 70 and 72 associated with the automated valve controls 38. Outflow of low pressure air from the valve 70 is conducted to the inlet fitting 28 for cleansing operation within the tank 12 by the air sparging array on the conduit 30, and to the operator of the mixer 42 through a solenoid valve 73. Outflow of low pressure air from the valve 72 is conducted to one side of the mixer 42.

Outflow of water from the potable water supply 46 through the manual valve 62 is conducted to a pair of solenoid valves 74 and 76. The valve 74 is connected through a motor driven drain valve 78 to the waste oil tank 40 and through a solenoid valve 80 to the bottom of the mixer 42.

The foregoing referred to solenoid operated valves 70, 72, 73, 74 and 76 and the motor driven valve 78 are connected to a plural panel bay type of programmable logic controller 80 through which valve operation is controlled in accordance with a multi-phase process for in-situ cleaning of the oil/water separator 10 pursuant to the present invention. Such process is accordingly initiated by placement of the separator 10 in a separation process mode by key control of the valve controller 80 after the contact of the waste oil tank 40 is checked for sufficient tank storage capacity to accommodate in-situ cleaning. If tank storage capacity is insufficient, then the waste tank 40 is emptied on shore before in-situ cleaning is undertaken.

To condition the system for automatic in-situ cleaning of the separator tank 12, the valves 56 and 60 are manually closed at the intake fitting 16 and the discharge fitting 20. The vent valves 26, 32 and 54, the potable water intake valve 62 and the low pressure air isolation valve 64 are then manually opened before a start button key of the valve controller 80 is activated to initiate a plurality of steps of an automated phase of operation of the automatic oil-water separation process. As the first step of such automated operational phase, the separator tank 12 is drained through the discharge fitting 20 and the opened drain valve 28. The separator tank 12 is then filled to ⅓ of its chamber volume capacity with potable water from supply 46. During a second step, the discharge fitting 20 is sequential opened and closed by the automated solenoid fill valve 74. The mixing tank 43 of the mixer 42 is then filled with water from the supply 46 during a third step, by sequential opening and closing of the automated solenoid valve 72. If a fourth automated flushing phase step then follows, air driven water mixing within the mixing tank 43 of the mixer 42 is effected by supply thereto of pressurized air in response to sequential opening and closing of the solenoid valve 73. One half of the mixture content within the mixing tank 43 of the mixer 42 is then dispensed into the separator tank 12 through the fitting 20 during a fifth step, by sequential opening and closing of the solenoid valve 76. The remainder of the chamber within separator tank 12 is then filled with potable water from the supply 46 during a sixth step, by sequential opening and closing of the solenoid fill valve 74. Air sparging in-situ cleaning is then performed for 4 hours during a seventh step, by sequential opening and closing of the solenoid valve 70 through which the low pressure air is delivered from the supply 44 to the conduit 30. Finally the motor driven drain valve 78 is sequentially opened and closed to drain the separator tank 12 into the waste oil tank 40 during an eighth step. The latter described eight phase steps are then repeated for four hour cleaning purposes as a ninth phase step. The separator tank 12 then undergoes a tenth phase step, involving its filling with potable water by inflow into the fitting 20 from the supply 46 through the solenoid fill valve 74, followed in sequence by a 15 minute air sparge cleaning in response to inflow of pressurized air through the solenoid valve 70 followed by draining of the separator tank 12 through the motor driven valve 78 into the waste oil tank 40. The latter described tenth phase step is then repeated as an eleventh step.

An interface operational phase may be instituted by personnel between the latter described third and fourth automated phase steps to interrupt the automatic in-situ cleaning process when indicated on display by the programmable logic controller 80. To institute the latter interface phase, the manual air isolation control valve 64, the manual potable water supply valve 62 and the manual separator tank vent valves 26, 32 and 54 are closed. The manual control valves 56 and 60 at the fitting 16 and 20 of the separator tank 12 are then opened to complete the interface step.

Obviously, other modifications and variations of the present invention may be possible in light of the foregoing teachings. It is therefore to be understood that within the scope of the appended claims the invention may be practiced otherwise than as specifically described.

What is claimed is:

1. An in-situ cleaning system for use in association with an oil-water separation apparatus having a separator tank and, within said separator tank, plural plates for effecting separation of oil from oily wastewater that is introduced into said separator tank, the cleaning system comprising:

a mixer for mixing potable water and a cleaning agent to form a mixture, said mixer including a mixing tank for containing said mixture;

an air sparging array, for situation within said separator tank and beneath said plates;

a computer-automated effluent drainage valve, for regulating drainage of effluent from said separator tank;

a first computer-automated water supply valve, for regulating supply of potable water from a potable water source to said mixing tank;

a computer-automated mixture supply valve, for regulating supply of said mixture from said mixing tank to said separator tank;

a second computer-automated water supply valve, for regulating supply of said potable water from said potable water source to said separator tank;

a computer-automated air supply valve, for regulating supply of pressurized air from a pressurized air source to said air sparging array;

a computer having resident in its memory a computer program product including a computer-useable medium having computer program logic recorded thereon for enabling said computer to control a process of cleaning said plates, said computer program logic being configured to:

transmit control signals to said computer-automated effluent drainage valve to drain effluent from said separator tank;

transmit control signals to said first computer-automated water supply valve to fill a portion of said mixing tank with a quantity of said potable water for being mixed with a quantity of said cleaning agent to form a quantity of said mixture;

transmit control signals to said computer-automated mixture supply valve to fill a portion of said separator tank with a quantity of said mixture;

transmit control signals to said second computer-automated water supply valve to fill a portion of said separator tank with a quantity of said potable water; and transmit control signals to said computer-automated air supply valve to effect air sparging by said air sparging array during containment by said separator tank of a quantity of said mixture and a quantity of said potable water, said air sparging resulting in air bubbles for enhancing cleaning of said plates.

2. The cleaning system of claim 1, the cleaning system further comprising said potable water source.

3. The cleaning system of claim 1, the cleaning system further comprising said pressurized air source.

4. The cleaning system of claim 1, the cleaning system further comprising said potable water source and said pressurized air source.

5. The cleaning system of claim 1, the cleaning system further comprising a waste oil tank for collecting said effluent that is drained from said separator tank and that results from said process of cleaning said plates.

6. The cleaning system of claim 5, the cleaning system further comprising said potable water source.

7. The cleaning system of claim 5, the cleaning system further comprising said pressurized air source.

8. The cleaning system of claim 5, the cleaning system further comprising said potable water source and said pressurized air source.

9. The cleaning system of claim 1, the cleaning system further comprising a computer-automated mixing actuator, said computer program logic further configured to transmit control signals to said computer-automated mixing actuator to effect said mixing of a quantity of said potable water and a quantity of said cleaning agent.

10. The cleaning system of claim 9, the cleaning system further comprising said potable water source.

11. The cleaning system of claim 9, the cleaning system further comprising said pressurized air source.

12. The cleaning system of claim 9, the cleaning system further comprising said potable water source and said pressurized air source.

13. The cleaning system of claim 9, the cleaning system further comprising a waste oil tank for collecting said effluent that is drained from said separator tank and that results from said process of cleaning said plates.

14. The cleaning system of claim 13, the cleaning system further comprising said potable water source.

15. The cleaning system of claim 13, the cleaning system further comprising said pressurized air source.

16. The cleaning system of claim 13, the cleaning system further comprising said potable water source and said pressurized air source.

17. The cleaning system of claim 9, wherein said computer-automated mixing actuator is characterized by valvular air supply capability for regulating supply of pressurized air from said pressurized air source to said mixer.

18. The cleaning system of claim 17, the cleaning system further comprising at least one of:
said potable water source;
said pressurized air source;
a waste oil tank, said waste oil tank being for collecting said effluent that is drained from said separator tank and that results from said process of cleaning said plates.

19. The cleaning system of claim 1, wherein said computer-automated air supply valve is a first computer-automated air supply valve, the cleaning system further comprising a second computer-automated air supply valve, said second computer-automated air supply valve being for regulating supply of pressurized air from said pressurized air source to said mixer, said computer program logic further configured to transmit control signals to said second computer-automated air supply valve to effect said mixing of a quantity of said potable water and a quantity of said cleaning agent.

20. The cleaning system of claim 19, the cleaning system further comprising at least one of:
said potable water source;
said pressurized air source;
a waste oil tank, said waste oil tank being for collecting said effluent that is drained from said separator tank and that results from said process of cleaning said plates.

* * * * *